United States Patent [19]

Ota

[11] Patent Number: 4,650,717
[45] Date of Patent: Mar. 17, 1987

[54] MAGNETIC RECORDING MEDIUM AND PROCESS FOR MANUFACTURING SAME

[75] Inventor: Hiroshi Ota, Komoro, Japan

[73] Assignee: TDK Corporation, Tokyo, Japan

[21] Appl. No.: 771,282

[22] Filed: Aug. 30, 1985

[30] Foreign Application Priority Data

Sep. 3, 1984 [JP] Japan .................. 59-182845

[51] Int. Cl.⁴ .................................. G11B 5/70
[52] U.S. Cl. ................... 428/403; 427/128;
252/62.54; 428/404; 428/694; 428/522;
428/521; 428/523; 428/900
[58] Field of Search ............. 428/694, 695, 900, 328,
428/403, 404, 329, 522, 521, 533; 427/128, 131;
252/62.54; 360/134–136

[56] References Cited

U.S. PATENT DOCUMENTS

| | | |
|---|---|---|
| 4,407,901 | 10/1983 | Miyatsuka ........................... 428/900 |
| 4,454,282 | 6/1984 | Bradshaw ........................ 252/62.54 |
| 4,550,054 | 10/1985 | Yamauchi ........................... 428/403 |
| 4,562,117 | 12/1985 | Kikukawa ........................... 428/407 |
| 4,578,313 | 3/1986 | Ito ........................................ 428/403 |
| 4,578,314 | 3/1986 | Ohta .................................... 428/403 |
| 4,582,759 | 4/1986 | Ota ...................................... 428/403 |
| 4,584,243 | 4/1986 | Kadokura ........................... 428/403 |

Primary Examiner—Ellis P. Robinson
Attorney, Agent, or Firm—Wood, Dalton, Phillips, Mason & Rowe

[57] ABSTRACT

A magnetic recording medium includes a magnetic layer which consists of a magnetic powder, and also an abrasive where necessary, dispersed in a binder, the magnetic powder or both the powder and the abrasive being coated, by adsorption, with a polycarboxylic acid copolymer. In manufacturing the medium, the copolymer is thoroughly mixed with the magnetic powder, and where necessary with the abrasive too, and the resulting mixture is further mixed with the binder.

3 Claims, 3 Drawing Figures

MAGNETIC RECORDING MEDIUM AND PROCESS FOR MANUFACTURING SAME

BACKGROUND OF THE INVENTION

This invention relates to a magnetic recording medium for use as video tape, audio tape, magnetic disk or the like and a process for manufacturing the same. More particularly, the invention concerns a magnetic recording medium with various properties modified through improved dispersion of a magnetic powder, and where necessary of an abrasive too, in the magnetic layer, and also concerns a process for manufacturing the medium.

Heretofore, the magnetic recording medium such as magnetic tape has been commonly manufactured by dispersing and mixing a magnetic iron oxide or ferromagnetic powder in the form of needles or granules together with a dispersing agent, binder, lubricant, with or without the addition of other ingredients on a ball mill, applying the resulting mixture to a base film of polyester or the like, and then drying the coat to form a magnetic layer over the base.

The recent tendency toward higher density recording has caused a strong demand for magnetic recording media with better signal-to-noise ratio and improved surface properties. To satisfy the demand varied attempts have already been made. Typical of them is the addition of a dispersing agent aimed at improving the dispersibility of the magnetic powder and other additives in the binder. Usually, such a dispersing agent is simply added to a mixture of the magnetic powder, additives, and binder, and the components are dispersed and mixed altogether. The dispersant addition in this manner does not produce a good dispersion because the solid particles can scarcely be dispersed. It therefore brings only slight improvements in S/N ratio and other recording medium characteristics.

The dispersing agents for this application have been limited to ordinary surface active agents.

In view of the foregoing, intensive research has been made to obtain a magnetic recording medium with properties modified through improved dispersion of the magnetic powder and additives into the binder and also to broaden the applicable scope of the dispersibility improver. As a result, it has now been found that a very good dispersion is attained by allowing the magnetic powder, and where necessary the abrasive too when the latter is employed, to adsorb a polycarboxylic acid copolymer in advance and then mixing the magnetic powder, and also the abrasive where necessary, thus treated on the surface with the binder. The discovery has led to the present invention.

SUMMARY OF THE INVENTION

It is a principal object of the present invention to obtain a magnetic recording medium with improved surface properties such as glossiness and squareness ratio by uniformly dispersing the magnetic powder and abrasive into the binder.

Another object of the invention is to broaden the scope of application of the agent for improving the dispersibility of the magnetic powder and abrasive in the binder.

These objects are realized by a magnetic recording medium having a magnetic layer formed by dispersing a magnetic powder, and where necessary an abrasive too, into a binder, in the manufacture of which a polycarboxylic acid copolymer, having a molecular weight of 100000 or below and wherein the hydrogen atoms of the carboxyl groups have been replaced by basic groups, is added to the magnetic powder and where necessary to the abrasive too, the mixture is thoroughly stirred, and the resulting mixture is mixed with the binder.

DETAILED DESCRIPTION

Figure 1:
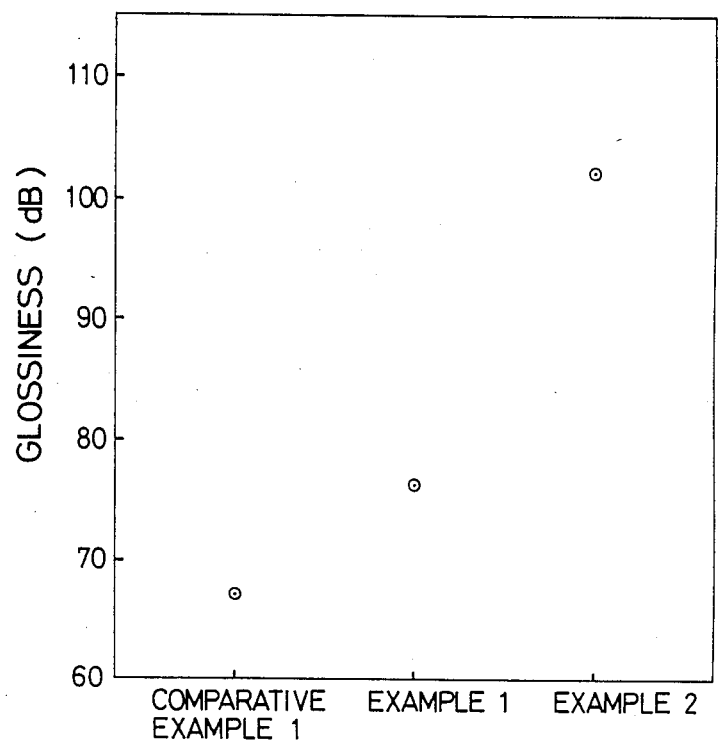
FIG. 1 is a graph comparing the glossiness values of magnetic recording medium specimens obtained in examples of the invention and in a comparative example.
Figure 2:
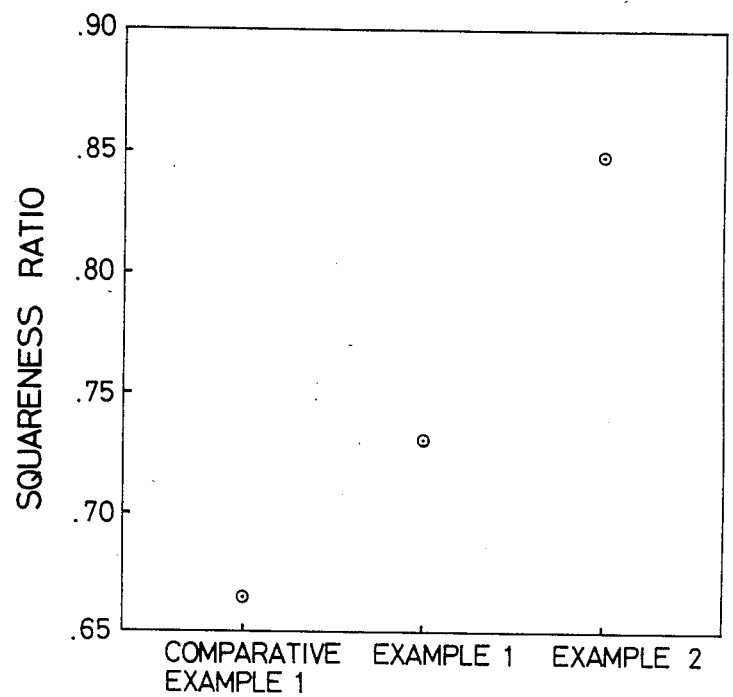
FIG. 2 is a graph similar to FIG. 1 but comparing squareness ratio values.
Figure 3:
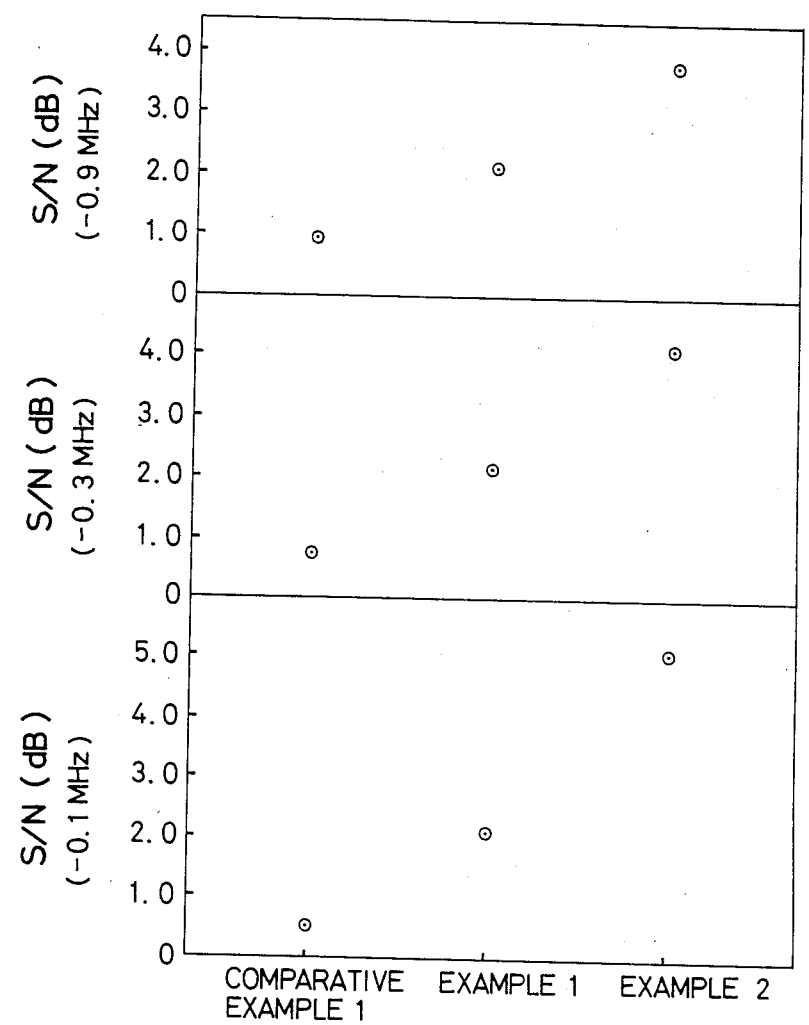
FIG. 3 is a graph comparing S/N ratio values.

The polycarboxylic acid copolymers which may be used in the present invention are those having a plurality of carboxyl groups in the molecule of the copolymer or those whose carboxyl groups have been partly or wholly neutralized with an alkali. To be more concrete, they include the copolymers of two different carboxylic acid monomers, a carboxylic acid and styrene or other monomer, and of monomers part or the whole of which has been neutralized with an alkali. Among the useful carboxylic acid monomers are mono- and polycarboxylic acid monomers. For example, copolymers of such combinations as styrene and maleic acid, acrylic acid and maleic acid, and maleic acid and diisobutylene, with or without replacement of the hydrogen atoms of the carboxyl groups with basic groups through partial or complete neutralization, may be employed. Generally, the polycarboxylic acid copolymer is desired to be neutralized before use. Otherwise, with a magnetic powder coated, for example, with cobalt, dissociation of the carboxylic acid or acids could cause cobalt elution and therefore a decrease in the coercive force of the resulting magnetic layer. Also, when the magnetic powder is a finely divided metal, rusting could result.

In the practice of the invention, the polycarboxylic acid copolymer is added beforehand to the magnetic powder or to both the magnetic powder and the abrasive where the latter is used.

When mixing the solid particles of the polycarboxylic acid copolymer and magnetic powder, and also the abrasive where necessary, it is desired that the components be all small in particle diameter so that the polycarboxylic acid copolymer can be satisfactorily dispersed. The mixing ratio of these components is such that from 0.5 to 10% by weight of the polycarboxylic acid copolymer is used on the basis of the weight of the magnetic powder or the combined weight of the powder and the abrasive when the latter is employed.

To mix the polycarboxylic acid copolymer with the magnetic powder and/or the abrasive powder, a mixer is usually used.

Also, in practicing the invention, the polycarboxylic acid copolymer is preferably dissolved in a solvent and used in the form of a solution. In this case the magnetic powder, or the powder and the abrasive when necessary, are added to the polycarboxylic acid copolymer solution and thoroughly stirred together, and the resulting mixture is further mixed with the binder. While any desired solvent may be utilized to dissolve the polycarboxylic acid copolymer, water, ethanol or the like is preferred. The concentration of the polycarboxylic acid copolymer in the solution ranges from 2 to 50%, preferably from 5 to 40%. Where a larger amount of the solvent is used, the magnetic powder or both the powder and the abrasive where necessary are separated from the solution, preferably with subsequent drying before use. The separation may be effected in a routine way, e.g., by filtration or centrifuging. The polycarboxylic acid copolymer is held by adsorption on the surfaces of the magnetic powder and abrasive thus separated from the copolymer solution. It is presumably by dint of the polycarboxylic acid copolymer securely adsorbed by the magnetic powder and abrasive surfaces that a better dispersion than heretofore is produced when the two components are mixed with the binder. Such favorable adsorption of the polycarboxylic acid copolymer by the magnetic powder and abrasive can be confirmed by CHN analysis, extraction, pyrolysis gas chromatography (PGC), and other techniques. In order to facilitate the dissolution of the polycarboxylic acid copolymer and the adsorption of the copolymer by the magnetic powder and abrasive, it is desirable to heat the magnetic powder or its mixture with the abrasive which may be added when necessary. In the latter case, the higher the mixture temperature the easier will be the copolymer adsorption by the magnetic powder and abrasive. Too high a temperature is not desirable, however, because it would produce no more favorable result to an economic disadvantage and, moreover, it would decompose the polycarboxylic acid copolymer. The concentration of the copolymer in the solution generally is desired to be on the higher side of the range specified above since it helps the magnetic powder and abrasive to adsorb the copolymer more readily.

The amount of the polycarboxylic acid copolymer to be adsorbed ranges from 0.5 to 10% by weight, preferably from 0.7 to 7% by weight, on the basis of the weight of the magnetic powder or the combined weight of the polymer and the abrasive when used.

Abrasives which may be added according to the necessity in conformity with the invention include alumina, titanium oxide, titanium nitride, chromium nitride, and chromium oxide. To the mixture of the polycarboxylic acid copolymer and magnetic powder thus obtained are added the binder and, where necessary, the abrasive and other additives. The whole mass is thoroughly mixed by a ball mill or the like. In the case of a mixture of the polycarboxylic acid copolymer and abrasive, the magnetic powder and binder are added thereto, together with other addition agents when necessary, and are mixed well. The resulting mixture is applied to a base film of polyester or the like, and the coat is processed on the surface. The film coated with the magnetic layer is thermally set to give a magnetic recording medium.

The magnetic recording medium of the invention actually obtained by following the afore-described procedure exhibited excellent glossiness, squareness ratio, and other surface properties owing to the uniform dispersion in the binder of the magnetic powder and also the abrasive when added of necessity.

The invention is illustrated by the following examples, in which parts and percentages are all by weight.

| Composition A | |
|---|---|
| Ingredient | Part |
| Vinyl chloride-vinyl acetate copolymer | 20 |
| Polyester resin | 13 |

| Composition A | |
|---|---|
| Ingredient | Part |
| Lubricant (silicone oil) | 5 |
| Methyl ethyl ketone | 100 |
| Methyl isobutyl ketone | 100 |
| Cyclohexanone | 100 |

EXAMPLE 1

To 100 parts by weight of $\gamma$-$Fe_2O_3$ powder (cobalt-doped) was added 3.5 parts of a polycarboxylic acid copolymer (a copolymer prepared by the polymerization of maleic acid and diisobutylene and neutralized with NaOH, having a molecular weight of 20000). The two components were thoroughly mixed by a mixer.

The resulting mixture and Composition A were charged into a ball mill and mixed well. Five parts of a polyfunctional aromatic isocyanate (tradenamed "Coronate L", a product of Nippon Polyurethane Industry Co.) was added and the whole was further mixed. The mixture so obtained was applied to a 12 $\mu$m-thick polyester-base film so as to form a magnetic layer which would have a dry thickness of 6 $\mu$m, and the coat was processed on the surface. The film coated with the magnetic layer was heat-treated at 60° C. for 48 hours for setting. It was then slitted to obtain magnetic tape specimens.

The magnetic tape specimens thus obtained were tested for glossiness and squareness ratio. The glossiness was determined using a mirror glossiness tester marketed by Murakami Color Technical Research Institute, Inc., at an angle of 60 deg. The squareness ratio was determined by means of a vibrating sample magnet meter manufactured by Toei Industry Co. The results are shown in the accompanying drawings.

EXAMPLE 2

One hundred parts of $\gamma$-$Fe_2O_3$ powder (cobalt-doped) was added to 1000 parts of a 5% aqueous solution of the same polycarboxylic acid copolymer as used in Example 1. The mixture was adequately stirred by a homomixer (manufactured by Tokushu Kika Kogyo Co.), heated to 60° C., and stirred again. The $\gamma$-$Fe_2O_3$ powder was filtered away from the solution and dried. A CHN analysis of the treated $\gamma$-$Fe_2O_3$ powder indicated that 3.5% of the polycarboxylic acid copolymer on the basis of the $\gamma$-$Fe_2O_3$ had been adsorbed by the latter.

The total amount of this surface-treated $\gamma$-$Fe_2O_3$ and Composition A were placed in a ball mill, and thenceforth the procedure of Example 1 was repeated to obtain magnetic tape specimens.

The tape specimens thus obtained were tested in the same was as in the preceding example. The results are shown in the graphs of the accompanying drawings.

COMPARATIVE EXAMPLE 1

One hundred parts of $\gamma$-$Fe_2O_3$ powder (cobalt-doped) and Composition A were charged into a ball mill. Then, by the same procedure as used in Example 1, magnetic tape specimens were obtained.

The specimens were subjected to the same tests as in Example 1 and gave results as shown.

As is obvious from the graphs, the magnetic recording medium obtained by the process of the invention is improved in glossiness, squareness ratio, and other surface properties over the comparative example specimens.

What is claimed is:

1. A magnetic recording medium comprising a magnetic layer of a uniform mixture of a magnetic powder, an abrasive powder, and a resinous binder, wherein said magnetic powder and said abrasive are precoated with 0.5 wt.%–10 wt.% of a polycarboxylic acid copolymer on the basis of total amount of said powders and having a molecular weight of 100,000 or below and the hydrogen atoms of the carboxylic groups said copolymer are at least partially replaced with alkali metals.

2. A magnetic recording medium according to claim 1, wherein said copolymer is a copolymer of two different carboxylic acid monomers, or carboxylic acid in styrene or other monomers.

3. A magnetic recording medium according to claim 2, wherein said copolymer is a copolymer of styrene and maleic acid, acrylic acid and maleic acid, or maleic acid and diisobutylene.

* * * * *